US008863014B2

(12) United States Patent
Legris

(10) Patent No.: US 8,863,014 B2
(45) Date of Patent: Oct. 14, 2014

(54) USER INTERFACE FOR PRODUCT COMPARISON

(75) Inventor: Martin Legris, Montreal (CA)

(73) Assignee: New Commerce Solutions Inc., Montreal (CA)

(*) Notice: Subject to any disclaimer, the term of this patent is extended or adjusted under 35 U.S.C. 154(b) by 0 days.

(21) Appl. No.: 13/276,998

(22) Filed: Oct. 19, 2011

(65) Prior Publication Data

US 2013/0104063 A1    Apr. 25, 2013

(51) Int. Cl.
| | | |
|---|---|---|
| G06F 3/048 | (2013.01) | |
| G06F 3/0484 | (2013.01) | |
| G06F 17/30 | (2006.01) | |
| G06Q 30/06 | (2012.01) | |

(52) U.S. Cl.
CPC ........ *G06F 17/30398* (2013.01); *G06F 3/0484* (2013.01); *G06F 17/30867* (2013.01); *G06F 17/30864* (2013.01); *G06Q 30/0641* (2013.01); *G06F 2203/04803* (2013.01); *G06Q 30/06* (2013.01)
USPC ............................ 715/765; 715/810; 715/835

(58) Field of Classification Search
USPC .............................. 705/26.61–26.64; 715/784
See application file for complete search history.

(56) References Cited

U.S. PATENT DOCUMENTS

| | | | | |
|---|---|---|---|---|
| 5,615,342 | A * | 3/1997 | Johnson ...................... 705/26.63 |
| 5,675,784 | A * | 10/1997 | Maxwell et al. ...................... 1/1 |
| 5,717,865 | A | 2/1998 | Stratmann |
| 5,983,220 | A * | 11/1999 | Schmitt .................................. 1/1 |
| 6,236,990 | B1 | 5/2001 | Geller et al. |
| 6,513,035 | B1 * | 1/2003 | Tanaka et al. ........................ 1/1 |
| 6,693,651 | B2 * | 2/2004 | Biebesheimer et al. ...... 715/837 |
| 6,760,039 | B2 | 7/2004 | Keeley |
| 6,768,997 | B2 * | 7/2004 | Schirmer et al. ............. 707/779 |
| 6,983,236 | B1 * | 1/2006 | Karlovac et al. ................ 703/22 |
| 7,082,426 | B2 * | 7/2006 | Musgrove et al. .................... 1/1 |
| 7,231,419 | B1 | 6/2007 | Gheorghe et al. |
| 7,234,111 | B2 | 6/2007 | Chu et al. |
| 7,246,110 | B1 | 7/2007 | Musgrove et al. |
| 7,257,548 | B2 * | 8/2007 | Hathaway et al. ......... 705/26.63 |

(Continued)

FOREIGN PATENT DOCUMENTS

| | | |
|---|---|---|
| EP | 1197888 | 4/2002 |
| WO | WO 00/45319 | 8/2000 |

OTHER PUBLICATIONS

International Searching Authority, International Search Report, 3 pages, Jan. 29, 2013.

*Primary Examiner* — Omar Abdul-Ali
*Assistant Examiner* — Phoebe Pan
(74) *Attorney, Agent, or Firm* — Benoit & Cote Inc.

(57) ABSTRACT

A novel search interface embedded in the specification sheet of a product. By manipulating the specification sheet of the product the user may filter and refine the search results without having to type search queries and without having to return to the main search result page. The user may select one (or more) of the product characteristics listed in the specification sheet to activate as a search criterion. For example, if the user is viewing monitors and activates the LED backlight product characteristic as a search criterion, the search interface would perform a search to filter out plasma monitors, LCD monitors etc. The user may manipulate other data in the specification sheet including the priority of the activated product characteristics, the order in which the product characteristics are displayed in the specification sheet. The user may also set search filters for the parameters of the product characteristics.

30 Claims, 19 Drawing Sheets

(56) References Cited

U.S. PATENT DOCUMENTS

| | | | |
|---|---|---|---|
| 7,457,772 B2 * | 11/2008 | Tabin | 705/26.64 |
| 7,499,901 B2 | 3/2009 | Crosby et al. | |
| 7,644,361 B2 | 1/2010 | Wu et al. | |
| 7,698,261 B1 * | 4/2010 | Khoshnevisan | 707/999.003 |
| 7,761,345 B1 | 7/2010 | Martin et al. | |
| 7,765,206 B2 * | 7/2010 | Hillis et al. | 707/723 |
| 7,890,528 B1 * | 2/2011 | Khoshnevisan | 707/769 |
| 7,904,810 B2 * | 3/2011 | Chen et al. | 715/268 |
| 7,912,458 B2 | 3/2011 | Ramer et al. | |
| 7,921,109 B2 * | 4/2011 | Parikh et al. | 707/731 |
| 7,945,571 B2 | 5/2011 | Wanker | |
| 7,958,051 B2 | 6/2011 | Jung et al. | |
| 8,027,884 B2 * | 9/2011 | Bezos et al. | 705/26.61 |
| 8,032,424 B1 * | 10/2011 | Fastenau et al. | 705/26.61 |
| 8,032,481 B2 * | 10/2011 | Pinckney et al. | 706/62 |
| 8,041,611 B2 * | 10/2011 | Kleinrock et al. | 705/26.7 |
| 8,065,261 B2 * | 11/2011 | Kellogg et al. | 706/62 |
| 8,099,683 B2 * | 1/2012 | Garbow et al. | 715/856 |
| 2002/0007378 A1 * | 1/2002 | Tanaka et al. | 707/513 |
| 2002/0032629 A1 | 3/2002 | Siegel et al. | |
| 2002/0078045 A1 | 6/2002 | Dutta | |
| 2002/0152135 A1 * | 10/2002 | Beeri et al. | 705/27 |
| 2002/0161656 A1 * | 10/2002 | Mongilio | 705/26 |
| 2005/0144093 A1 * | 6/2005 | Kassan | 705/27 |
| 2005/0144162 A1 * | 6/2005 | Liang | 707/3 |
| 2006/0041401 A1 * | 2/2006 | Johnston | 702/186 |
| 2006/0064410 A1 * | 3/2006 | Razza et al. | 707/3 |
| 2006/0064411 A1 * | 3/2006 | Gross et al. | 707/3 |
| 2006/0190350 A1 * | 8/2006 | Maas | 705/26 |
| 2006/0212362 A1 | 9/2006 | Donsbach et al. | |
| 2007/0143156 A1 * | 6/2007 | van Deursen | 705/5 |
| 2007/0192294 A1 * | 8/2007 | Ramer et al. | 707/3 |
| 2007/0198306 A1 * | 8/2007 | Crean et al. | 705/5 |
| 2008/0140577 A1 * | 6/2008 | Rahman et al. | 705/71 |
| 2008/0190272 A1 * | 8/2008 | Taub et al. | 84/645 |
| 2008/0208716 A1 | 8/2008 | Grove et al. | |
| 2008/0214152 A1 | 9/2008 | Ramer et al. | |
| 2008/0255967 A1 * | 10/2008 | Shi | 705/27 |
| 2008/0307363 A1 * | 12/2008 | Jalon et al. | 715/835 |
| 2008/0313574 A1 * | 12/2008 | Aravamudan et al. | 715/854 |
| 2009/0012940 A1 * | 1/2009 | Ives et al. | 707/3 |
| 2009/0063304 A1 * | 3/2009 | Meggs | 705/27 |
| 2009/0128587 A1 * | 5/2009 | Komiya et al. | 345/690 |
| 2009/0150343 A1 * | 6/2009 | English et al. | 707/3 |
| 2009/0299965 A1 | 12/2009 | Aziz et al. | |
| 2010/0017872 A1 * | 1/2010 | Goertz et al. | 726/16 |
| 2010/0115396 A1 * | 5/2010 | Byron et al. | 715/234 |
| 2010/0131881 A1 | 5/2010 | Ganesh | |
| 2010/0161355 A1 * | 6/2010 | Stangel | 705/3 |
| 2010/0211564 A1 * | 8/2010 | Cohen et al. | 707/722 |
| 2010/0231533 A1 * | 9/2010 | Chaudhri | 345/173 |
| 2010/0235340 A1 * | 9/2010 | Todhunter et al. | 707/706 |
| 2010/0250322 A1 | 9/2010 | Norwood | |
| 2010/0251175 A1 | 9/2010 | Brunkhorst et al. | |
| 2010/0318551 A1 * | 12/2010 | Lai | 707/765 |
| 2011/0069017 A1 * | 3/2011 | Victor | 345/173 |
| 2011/0078595 A1 * | 3/2011 | Johnston et al. | 715/764 |
| 2011/0082824 A1 * | 4/2011 | Allison et al. | 706/20 |
| 2011/0083078 A1 * | 4/2011 | Ju | 715/738 |
| 2011/0087673 A1 * | 4/2011 | Chen et al. | 707/748 |
| 2011/0138331 A1 * | 6/2011 | Pugsley et al. | 715/835 |
| 2011/0154254 A1 * | 6/2011 | Singh | 715/810 |
| 2011/0167341 A1 * | 7/2011 | Cranfill et al. | 715/702 |
| 2011/0191363 A1 * | 8/2011 | Bell et al. | 707/767 |
| 2011/0202533 A1 * | 8/2011 | Wang et al. | 707/738 |
| 2011/0202874 A1 * | 8/2011 | Ramer et al. | 715/810 |
| 2011/0252031 A1 * | 10/2011 | Blumenthal et al. | 707/733 |
| 2011/0302203 A1 * | 12/2011 | Tracy et al. | 707/769 |
| 2011/0302537 A1 * | 12/2011 | Dweck et al. | 715/853 |
| 2012/0005045 A1 * | 1/2012 | Baker | 705/27.2 |
| 2012/0174023 A1 * | 7/2012 | Kenemer et al. | 715/781 |
| 2013/0096937 A1 * | 4/2013 | Campbell et al. | 705/2 |

\* cited by examiner

USER INTERFACE FOR PRODUCT COMPARISON

BACKGROUND (a) Field

The subject matter disclosed generally relates to search interface tools. More particularly, the subject matter relates a search interface for product search and comparison.

(b) Related Prior Art

Conventional search interfaces allow the user to type in a search query and hit the search button to retrieve a list of products. FIG. 1 illustrates an example of a conventional search interface.

As shown in FIG. 1, the interface includes a space to type the search query 12 and one or more search parameters 14 to filter the search results before or after performing the initial search. The search parameters may include selection options including brand, performance, price and so on of the products that the user wishes to view.

FIG. 2 illustrates an example of a conventional product search path illustrating typical activities performed by a user using conventional search interfaces. As shown in FIG. 2, the initial search 16 may provide search results 18 including a plurality of items. The user may view the first item 20, and move the next item 22 if a "next" button is provided. The user may go back to the main results page using breadcrumbs. Breadcrumbs is a navigation aid used in user interfaces which provides links back to each previous page the user navigated through to get to the current page. From the results page 18 the user may select to view the third item 24. The search interface may provide a suggestion to view a similar item 26 which the user may read its reviews and add it to the shopping cart 28.

These activities are time consuming and confusing for the average consumer. The challenge also increases when the page is being surfed using a portable device having a smaller screen such as a portable phone, IPAD, IPOD and the like.

In particular, conventional user interfaces do not fit neatly in a mobile browser's display, as illustrated in FIG. 3. Additionally, switching screens on a mobile phone can be more confusing because the navigational context is restricted on the mobile interface. For example the whole top bar which offers consistency throughout the site cannot exist on the mobile interface because of the need to dedicate screen real-estate (space) to practical information. In many cases even putting the logo of the store becomes cumbersome. Moreover, the navigation possibilities on smaller screens are also limited. For example, it is not possible to go back through breadcrumbs, visit similar items, visit popular items in a category, and visit product recommendations.

Therefore, it is necessary to simplify the task of refining a search and to reduce switching screens in a search interface.

SUMMARY

According to an aspect, there is provided a graphical user interface on a display operatively connected to a computing device comprising a memory and a processor to execute one or more programs stored on the memory for implementing the graphical user interface, the graphical user interface comprising:

a first region provided at a first location of the display for displaying search results;

a second region provided at a second location of the display within the first location, for displaying a specification sheet of a product, the specification sheet including data that may be manipulated by a user including one or more product characteristics that may be selectively activated and ranked by the user;

wherein upon detection of a change in the activation and/or ranking of a product characteristic, a search refinement is performed using the activated product characteristics and their associated ranking as search criteria.

In an embodiment, the ranking of a selected product characteristic is changed by changing the location of the product characteristic (e.g. by dragging the product characteristic into a different location) within the second region.

In another embodiment, the ranking of a selected product characteristic is changed by manually setting the new ranking as a number, character, or symbol.

In yet another embodiment, the interface visually reorders the product characteristics in accordance with the ranking associated with each product characteristic.

According to a further embodiment, the interface further comprises a search filter for a parameter available on one or more of the product characteristics.

According to another embodiment, the search filter comprises one of: a search range and a selection of one or more options. In another embodiment, the search filter may further include a button defining one of the following functions: on, off, and ignore.

According to yet another embodiment, the interface comprises a third region provided at a third location within the first location and distinct from the second location, for displaying details of a single product, the third region being scrollable to illustrate different products one product at a time.

According to a further embodiment, the product characteristics in the second region are updated every time a different product is displayed in the third region.

According to another embodiment, the user may personalize the visual appearance of the specification sheet by reordering activated and non-activated product characteristics, wherein the specified order applies to currently and subsequently viewed products.

According to yet another embodiment, the interface further comprises a visual indicator that indicates the number of products found in the search, and a visual indicator that indicates the position of the product displayed in the third region with respect to the first and last products found in the search.

According to a further embodiment, the interface switches between one product and the other in response to moving the second region in a desired direction.

According to another embodiment, the third region comprises a photo of the product.

According to yet another embodiment, when more than one product characteristics are activated, the interface returns sorted search results which are based on a weighted ranking of the activated product characteristics.

According to a further embodiment, the content of the first and second regions is received from a remote server over a communication network and/or loaded from at least one of: a local database and data files.

In another aspect, there is provided a computer readable storage medium storing one or more programs, the one or more programs comprising instructions which when executed by a computing device, cause the computing device to implement the graphical user interface as described above.

In yet another aspect, there is provided a method for performing a search using a computing device, the method comprising:

loading a specification sheet comprising one or more product characteristics for a product;

displaying the specification sheet in a product characteristic region on a display; and manipulating the specification sheet on the display to perform the search; wherein the manipulating excludes the typing of search queries.

According to an embodiment, manipulating further comprises activating one or more a product characteristics as search criteria.

According to another embodiment, manipulating further comprising setting a rank for one or more of the product characteristics.

According to yet another embodiment, the method further comprises changing the ranking of a selected product characteristic by changing the location of the product characteristic within the product characteristic region.

According to a further embodiment, the method further comprises changing the ranking of a selected product characteristic by manually setting the new ranking as a number, character, or symbol.

According to another embodiment, the method further comprises setting a search filter for a parameter of the product characteristic prior to performing the search.

According to yet another embodiment, the search filter comprises one of: search range and a selection of one or more options. In another embodiment, the search filter may further include a button defining one of the following functions: on, off, and ignore.

According to a further embodiment, performing the search comprises refining an existing search.

According to another embodiment, the method further comprises displaying search results on the display in a search result region distinct from the product characteristic region, the search result region displaying details of a single product at a time.

According to yet another embodiment, the method further comprises navigating through different products by moving the search result region in a desired direction.

According to a further embodiment, the method further comprises updating the product characteristics in the second region every time a different product is displayed in the third region.

According to a further aspect, there is provided computer readable storage medium storing one or more programs, the one or more programs comprising instructions which when executed by a computing device, cause the computing device to perform the method as described above.

According to another object, there is provided a computing device for performing product search comprising:

a processor;

a memory storing one or more programs, the one or more programs comprising instructions which, when executed by the processor of the computing device, cause the computing device to:

load a specification sheet comprising one or more product characteristics for a product;

display the specification sheet in a product characteristic region on a display;

receive an input produced by a manipulation of the specification sheet;

perform a search having activated product characteristics and a ranking associated with each activated product characteristic as search criteria.

According to an embodiment, the display is embedded within the computing device, the display being a touch-sensitive display.

According to another embodiment, the computing device receives the specification sheet from a server over a communication network using a communication interface of the computing device.

According to yet another embodiment, the computing device displays the search results on the display in a search result region distinct from the product characteristic region, the search result region being scrollable and displays details of a single product at a time.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The present embodiments describe a novel search interface embedded in the specification sheet of a product, whereby, by manipulating the specification sheet of the product the user may filter and refine the search results (already obtained) without having to type further search queries and without having to return to the main search result page. In an embodiment, the user may select one (or more) of the product characteristics listed in the specification sheet to activate the selected product characteristic as a search criterion. For example, if the user is viewing monitors and activates the LED backlight product characteristic as a search criterion, the search interface would perform a search to filter out plasma monitors, LCD monitors etc. The user may manipulate other data in the specification sheet including the priority of the activated product characteristics, the order in which the product characteristics are displayed in the specification sheet. The user may also set search filters for the parameters of the product characteristics.

In an embodiment, the user may define a search filter (aka range) for the parameter of a selected characteristic in order to view and compare products that fall within the specified range. For example, the user may select the price characteristic and specify a price range for the products they wish to view. When the range is specified the interface would refine the search to filter out the products that do not fall within the specified range.

Figure 1:
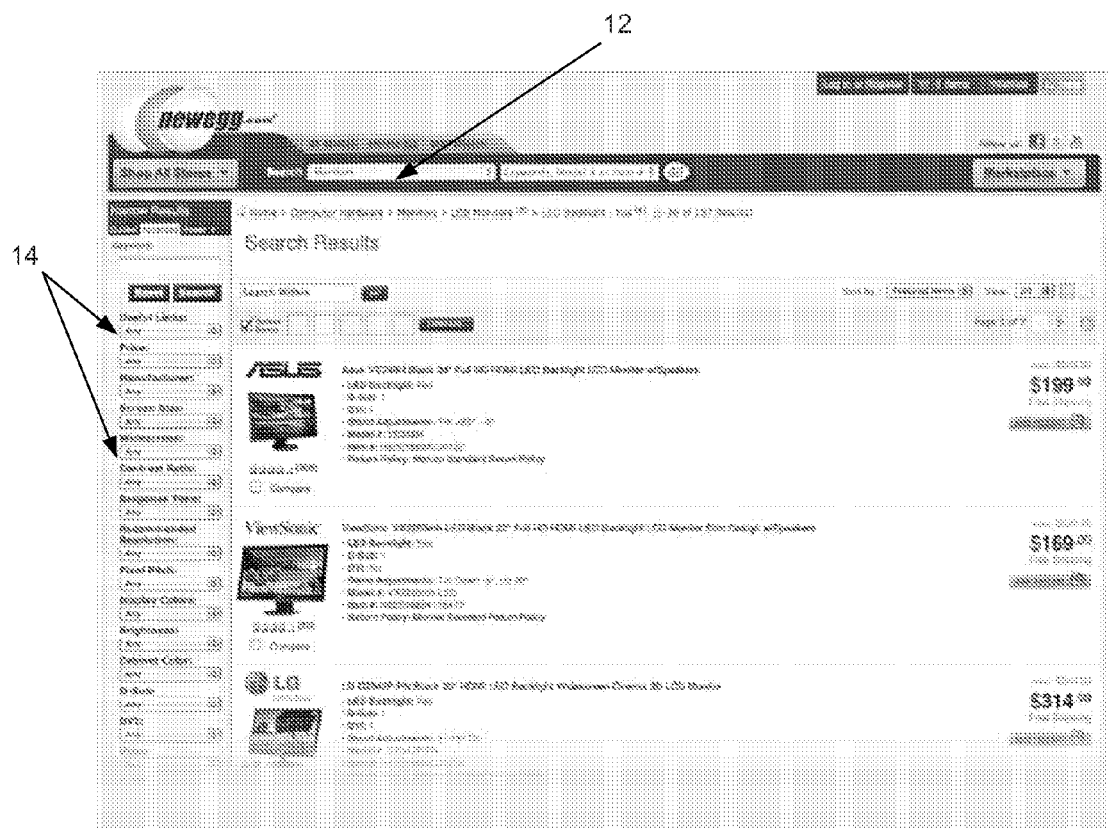
FIG. 1 illustrates an example of a conventional search interface.
Figure 2:
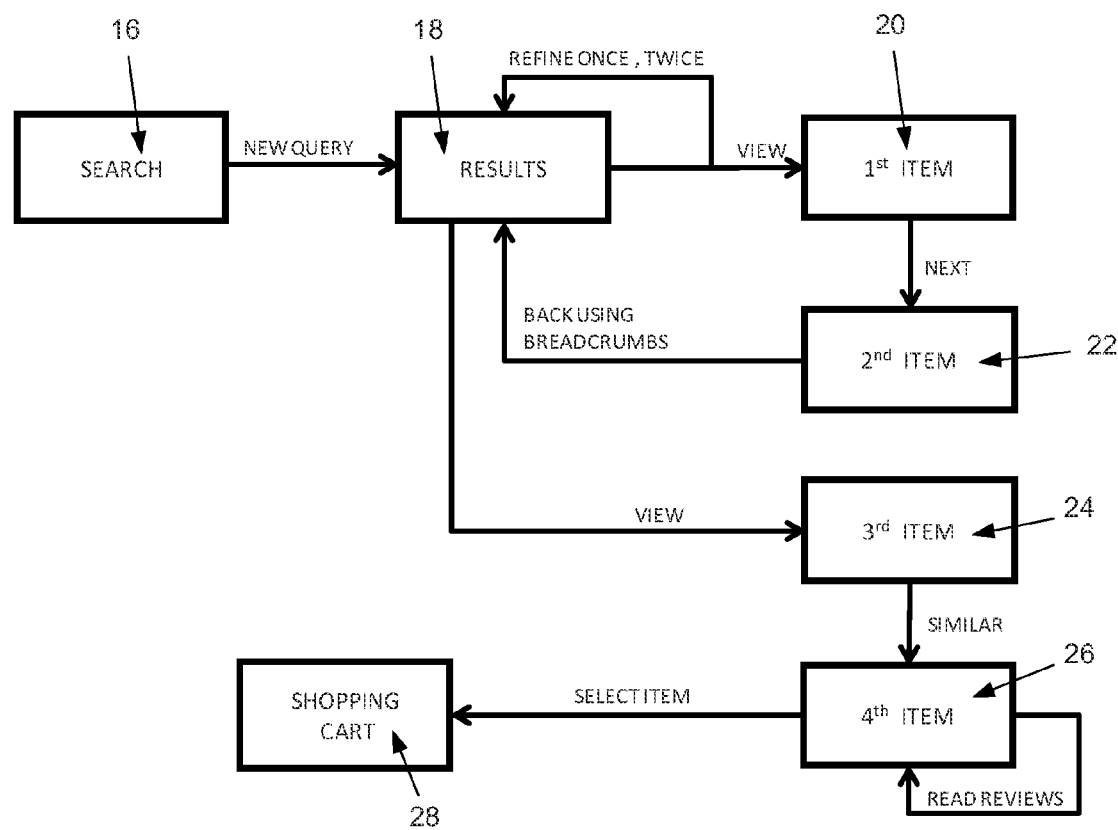
FIG. 2 illustrates an example of a conventional product search path when a search is performed using conventional search interfaces.
Figure 3:
FIG. 3 illustrates an example of a conventional search interface in a mobile browser's display.
Figure 4A:
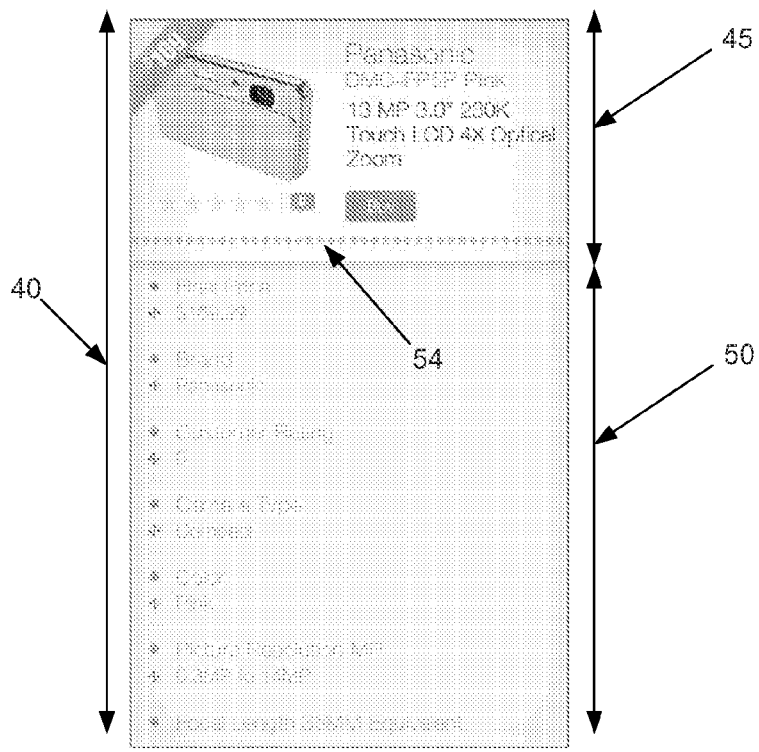
FIGS. 4a and 4b illustrates an example of a graphical user interface including a search interface embedded in the specification sheet of a product, in accordance with an embodiment.

FIG. 4a illustrates an example of a graphical user interface (GUI) including a search interface embedded in the specification sheet of a product, in accordance with an embodiment. As shown in FIG. 4a, the GUI 40 includes a search result region 45, and search interface region 50 embedded in the specification sheet of the product being searched. The specification sheet of a certain product includes a plurality of product characteristics such as brand, price, customer rating, type, color, performance etc. The specification sheet is specific to the type of products. For example, the specification sheet for refrigerators is different from the specification sheet of cameras. In an embodiment, the product characteristics in a specification sheet which appears in search interface region 50 are by default inactive as search criteria. For example, when the user searches cameras, they may view all available cameras without any limitations to the type, brand, performance etc.

Figure 4B:
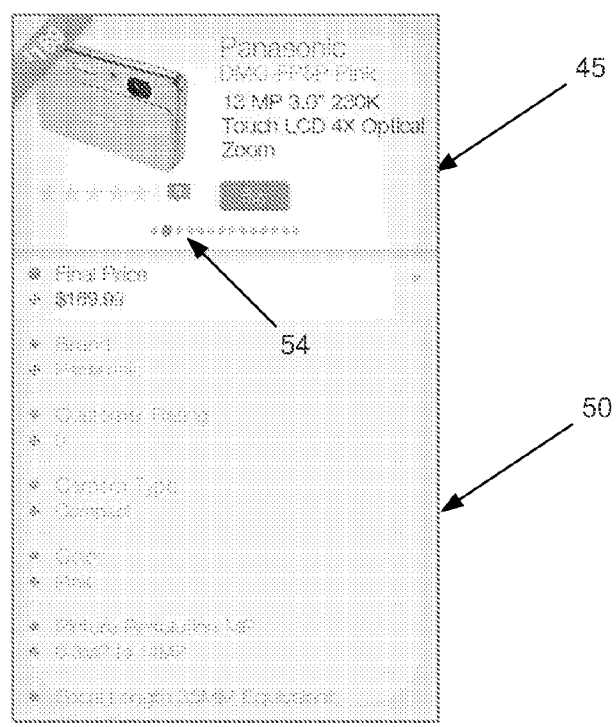

The search interface region 50 may provide a visual indicator 54 of the number of products found. In a non-limiting example of implementation, the visual indicator 54 may include a number of dots provided consecutively beside each other wherein the number of dots corresponds to the number of products found. The interface may highlight the dot that corresponds to the product being shown on the display. For example, if the user is viewing the specification sheet of the second product, the second dot may change colors and/or increase in size, as shown in FIG. 4b, so that the user may know where they are with respect to the number of products found/viewed.

As stated above, the user may activate one or more of the product characteristics in the specification sheet to be a search criterion. In the example of FIG. 4a, none of the product characteristics illustrated in this figure is activated. As shown in the visual indicator 54, a large number of cameras is available for viewing (each dot in the visual indicator 54 corresponds to a different product). In FIG. 4b the final price is activated as a search criterion. The search interface region 50 may then update the search to filter out any product that does not match the search criterion. In this case, the interface would refine the search to retrieve only those products which are priced $169.99 because this the parameter set in the activated search criterion which is the price. As shown in FIG. 4b the visual indicator 54 indicates that the number of products that match the search criterion is lower than the initial number in FIG. 4a.

In an embodiment, the user may personalize the visual appearance of the specification sheet by reordering the product characteristics within the specification sheet. For example, if the user wants to see one or more product characteristics at the top of the list, the user may reorder the product characteristics once and the change will be set for the current all subsequently viewed products until a further reordering is performed.

Figure 4C:
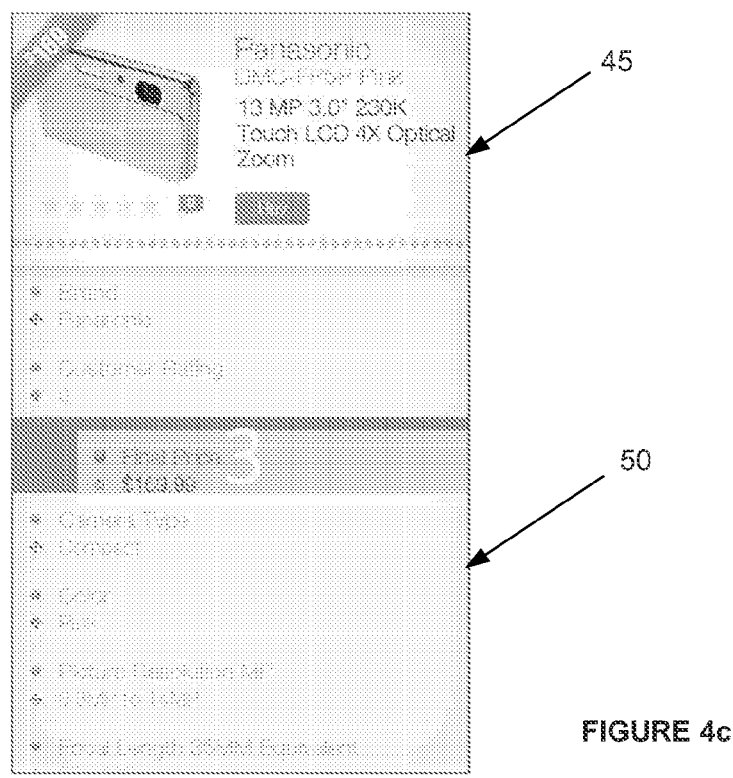
FIGS. 4c to 4d illustrate an example of reordering the product characteristics in the specification sheet.
Figure 4D:
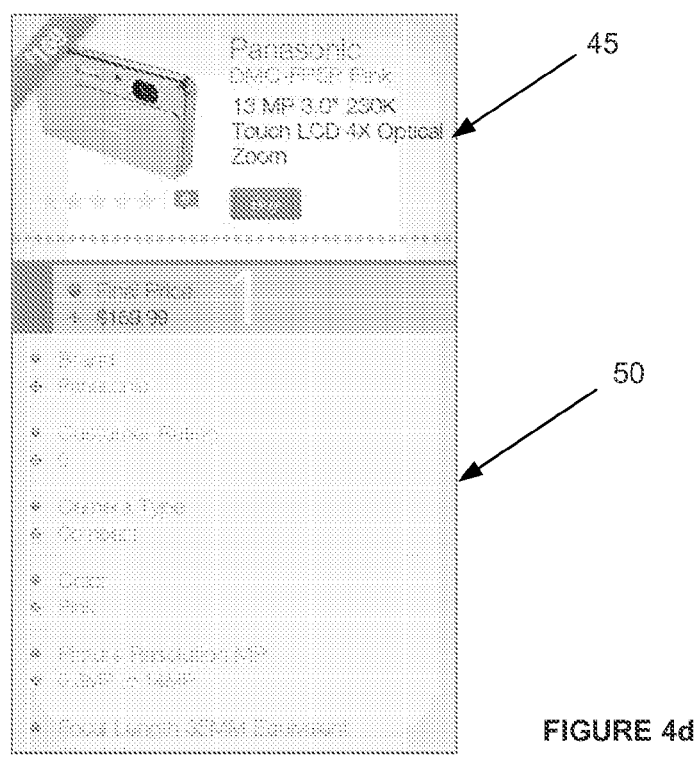

In a non limiting example of implementation, the user may drag a certain product characteristic to change its location within the specification sheet. FIGS. 4c and 4d illustrate an embodiment where the final price is dragged from position 3 to position 1 within the specification sheet.

Figure 5A:
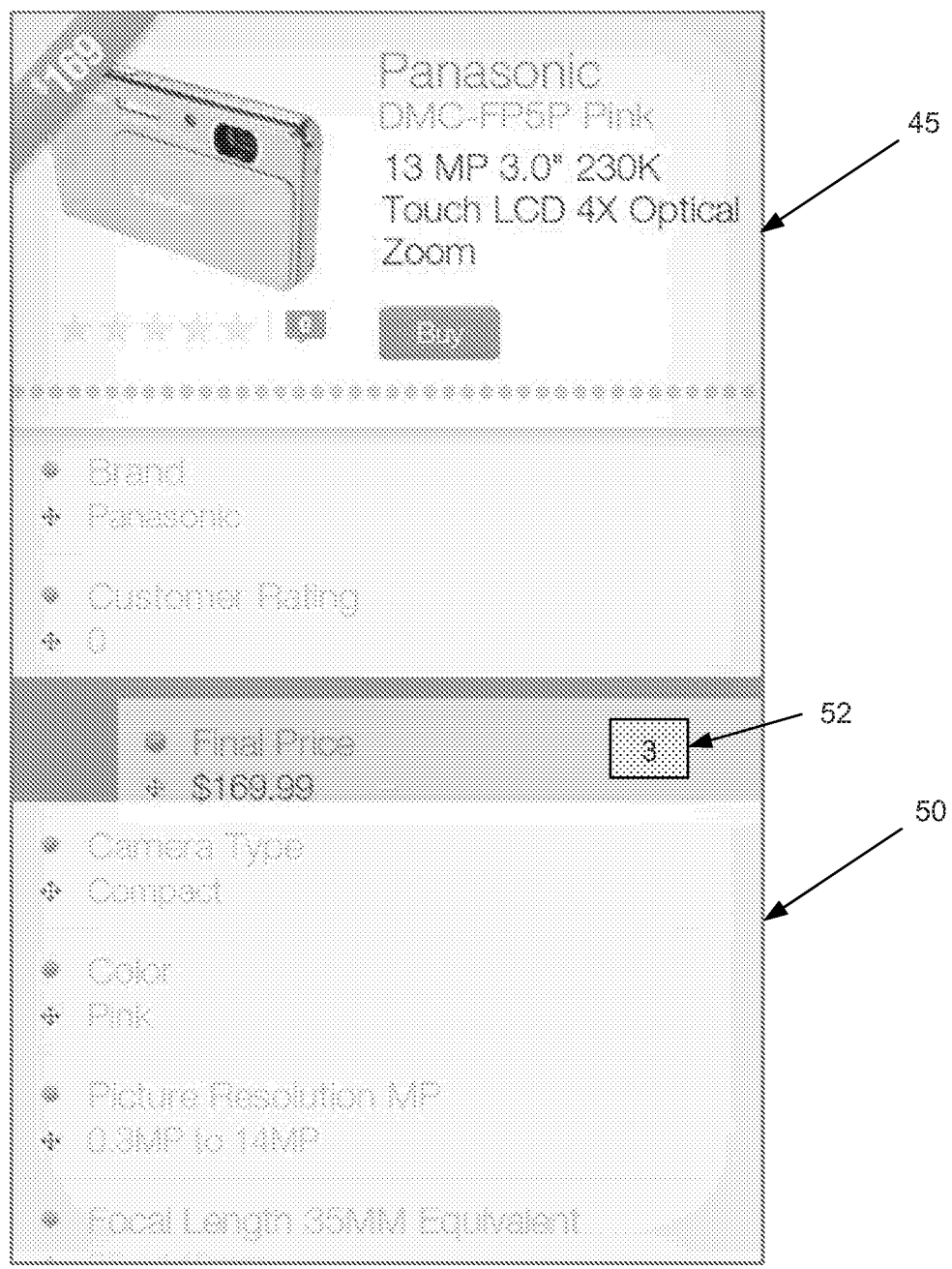
FIGS. 5a to 5d illustrate alternative methods for changing the order of a product characteristic in the specification sheet.
Figure 5B:
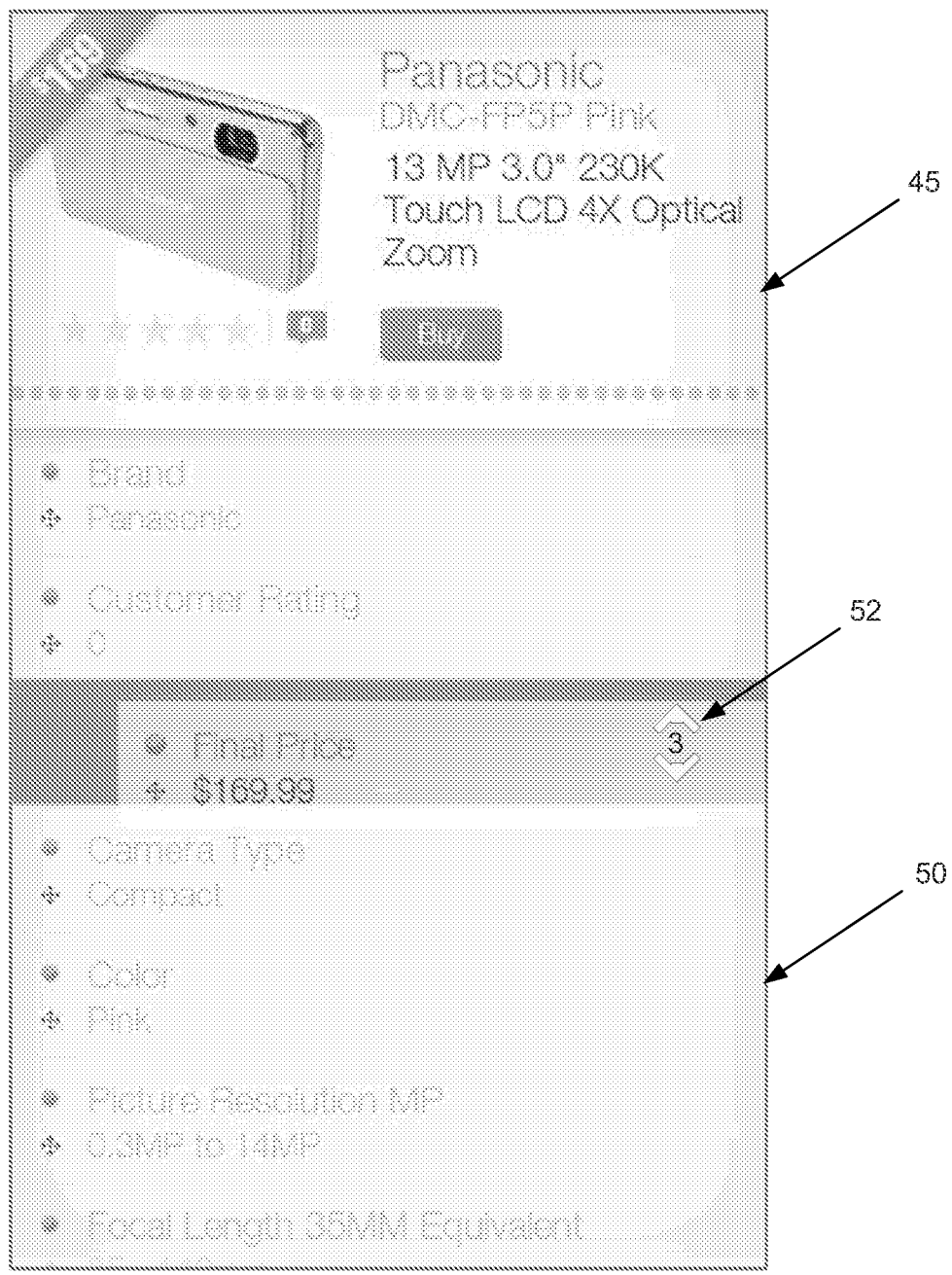
Figure 5C:
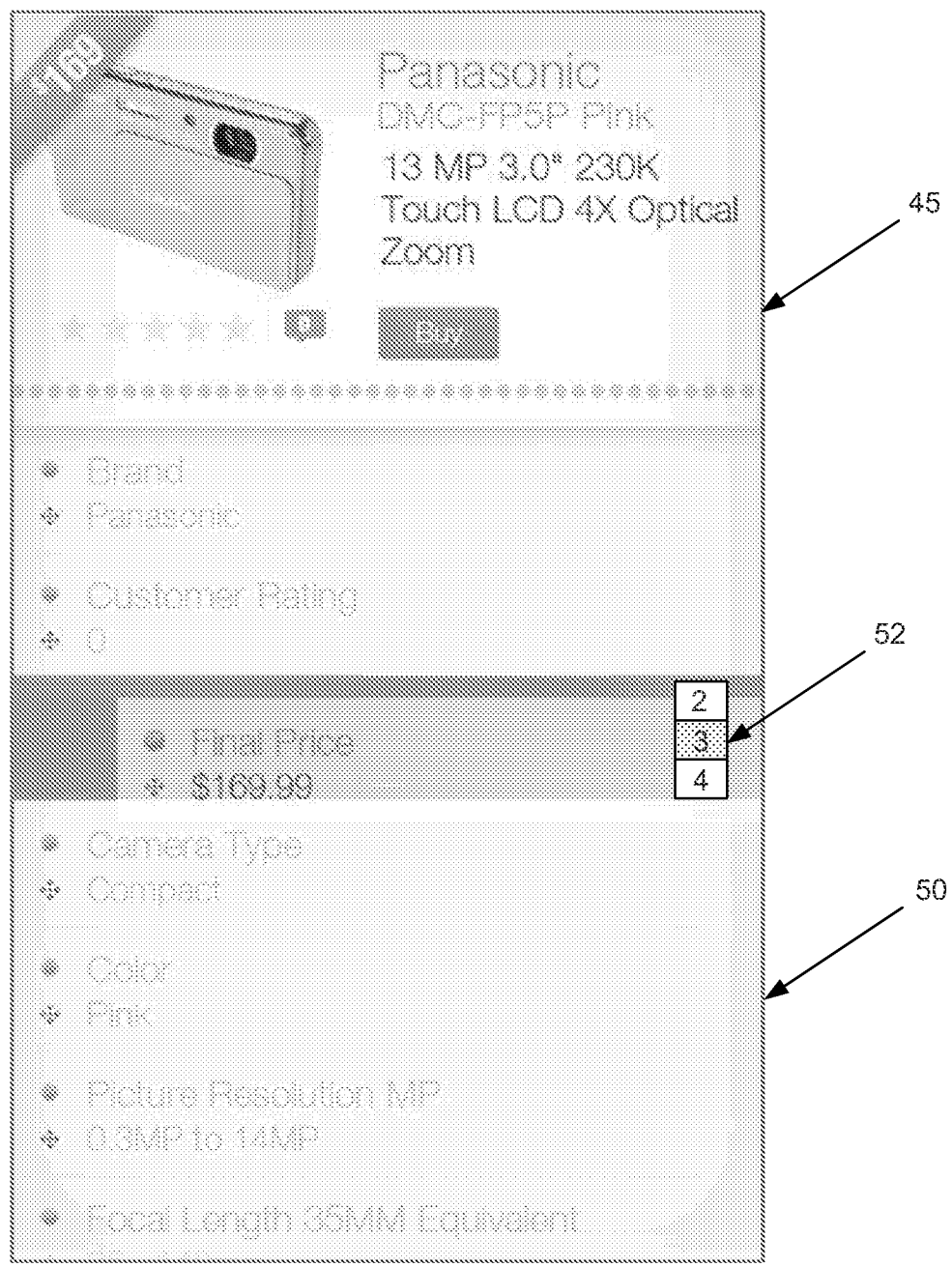
Figure 5D:
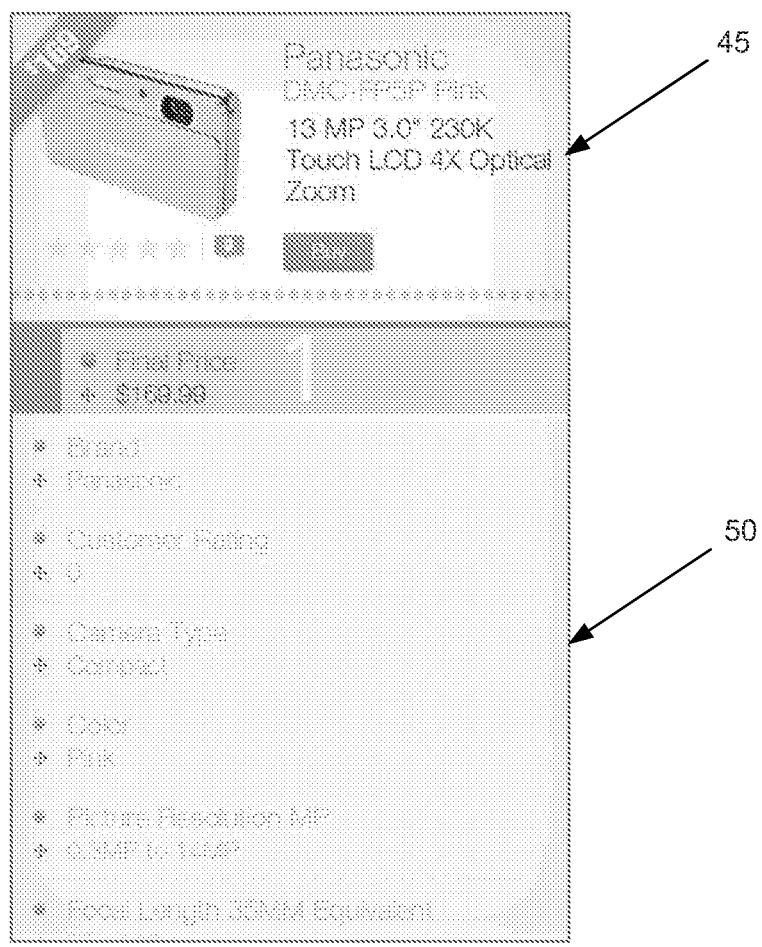

In another non-limiting example of implementation, the order may be adjusted manually by the user. With reference to FIGS. 5a to 5c, when the user selects a certain characteristic in the specification sheet which appears in search interface region 50, a window 52 may appear indicating the current order of the selected characteristic and giving the user the option to manually adjust the ranking. The user may adjust the ranking by typing in the new ranking as exemplified in FIG. 5a, by incrementally increasing or decreasing the existing ranking using arrows as exemplified in FIG. 5b, or using a wheel dial interface as exemplified in FIG. 5c. In the embodiments of FIGS. 5a to 5c, after the user sets the new order, the interface would visually reorders the product characteristics in accordance with the order set by the user for the selected product characteristics. For example, if the user manually enters 1 as the order for the final price, the interface would place the final price characteristic in the upper row as shown in FIG. 5d.

Figure 4E:
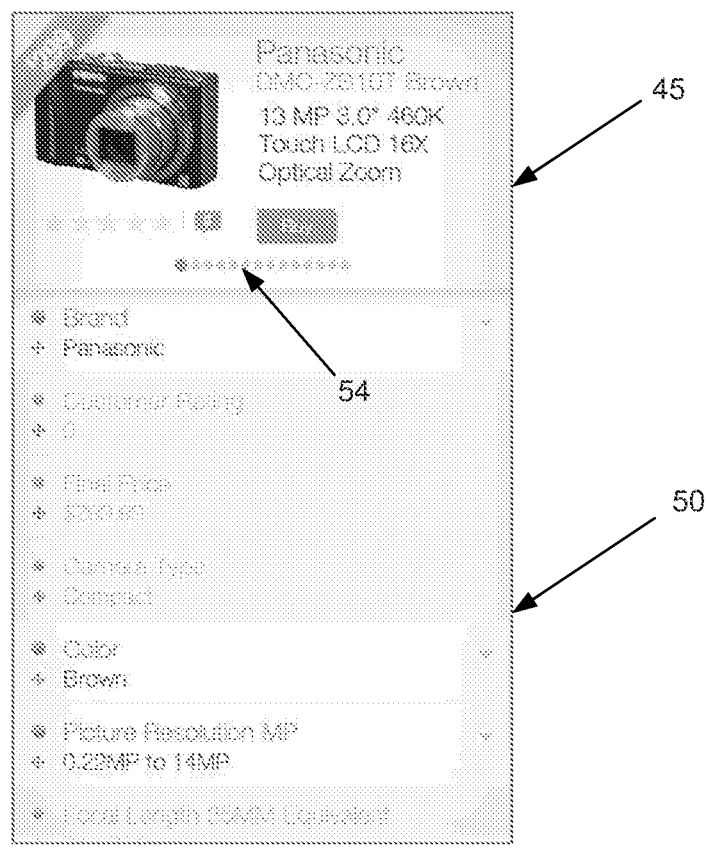
FIG. 4e illustrate an example of a specification sheet having more than one product characteristic activated.

In an embodiment, the order of the product characteristics in the specification sheet implies a search rank/priority when the products are activated as search criteria. For example, in the interface illustrated in FIG. 4e the product characteristics selected as search criteria are: the brand, color, and picture resolution. In the order listed in FIG. 4e, the brand has the highest search priority, the color has lesser priority, and the picture resolution has the least priority. In an embodiment, a ranking algorithm is used for weighing the ranking of the activated product characteristics when the search is performed.

Figure 6:
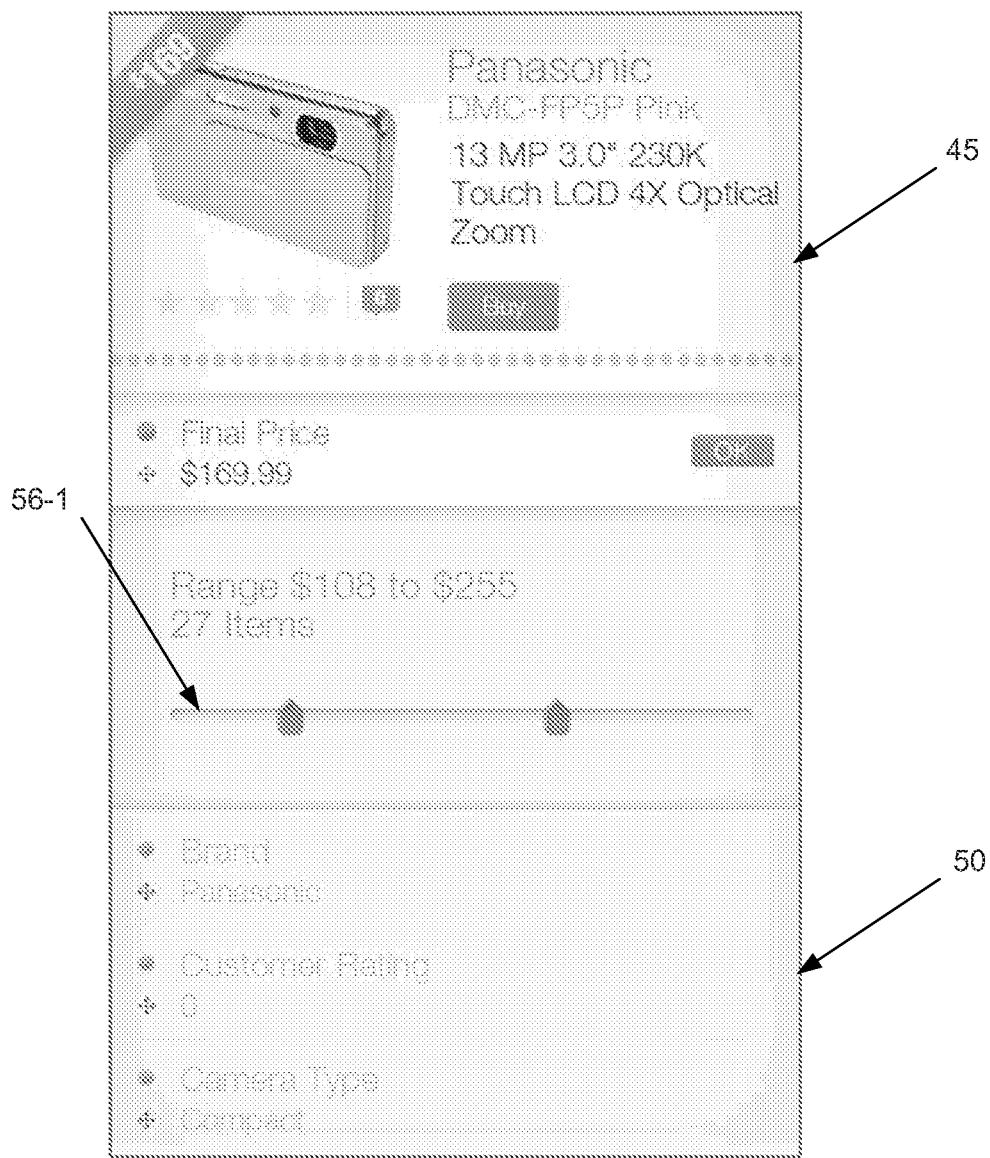
FIG. 6 illustrates an example of search interface which allows the user to adjust the search parameters of product characteristic.

In addition to adjusting the ranking for the product characteristics, the user may set a search filter for the search parameters of the product characteristic, in an embodiment. FIG. 6 illustrates an example of search interface region 50 which allows the user to adjust the search parameters of the product characteristic. In the example of FIG. 6, the selected product characteristic is the price, and the user has specified a search filter 56-1 defining a price range extending between 108$ and 255$ for the products (cameras) that they wish to view/compare.

Figure 7:
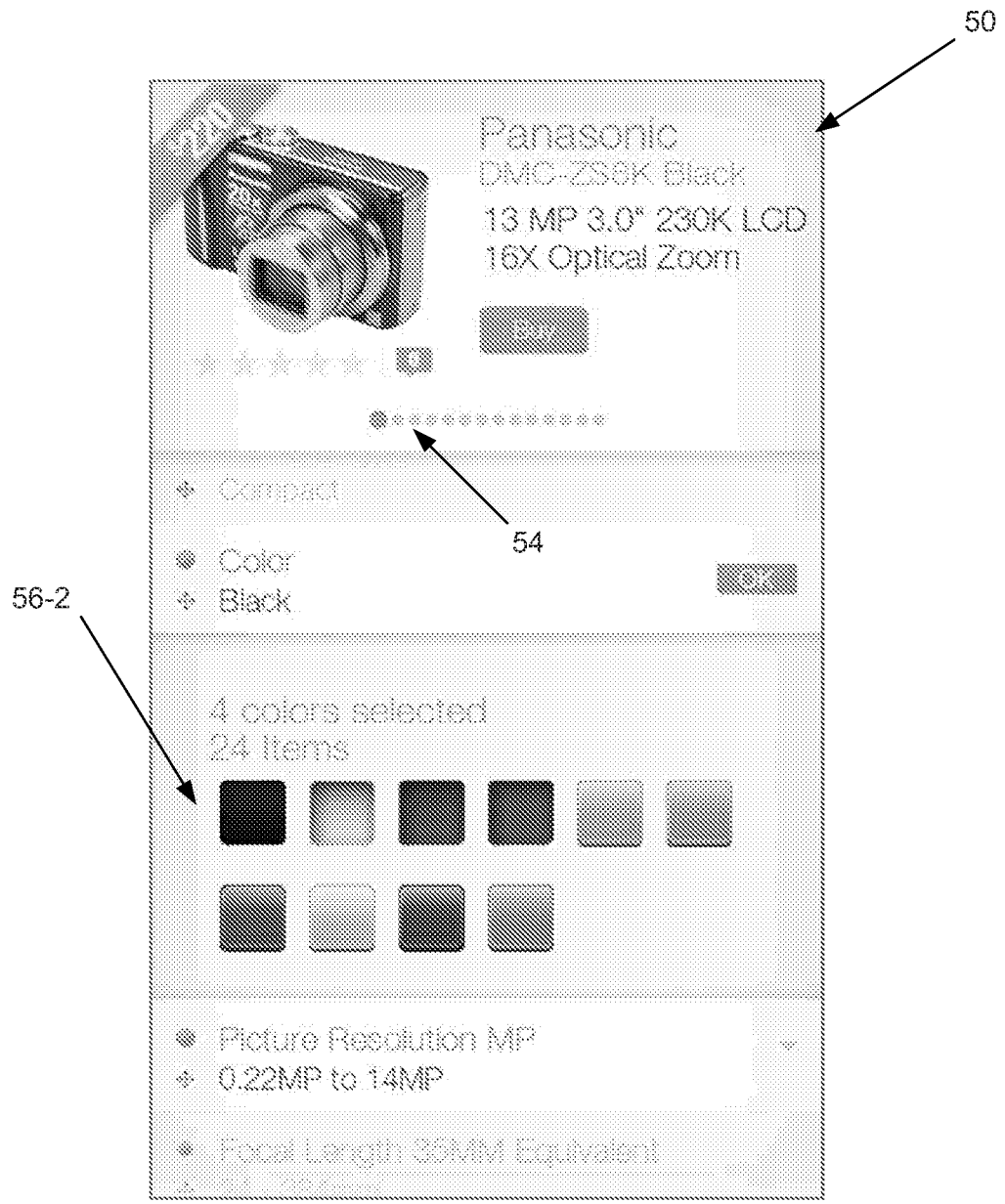
FIG. 7 illustrates a search interface which allows the user to select the colors of the products that they wish to view/compare.
Figure 8:
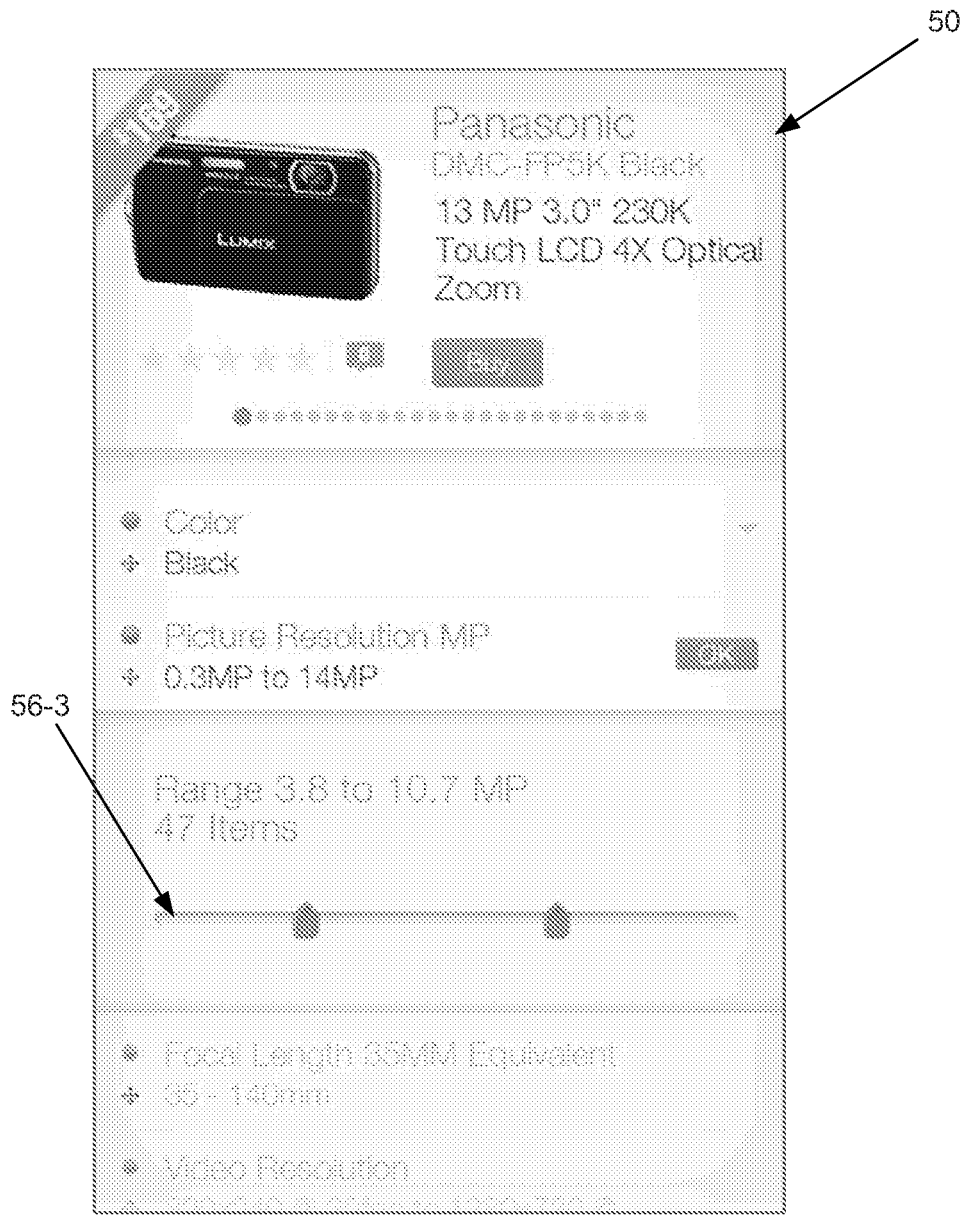
FIG. 8 illustrates a search interface which allows the user to select the picture resolution range of the products they wish to view/compare.
Figure 9:
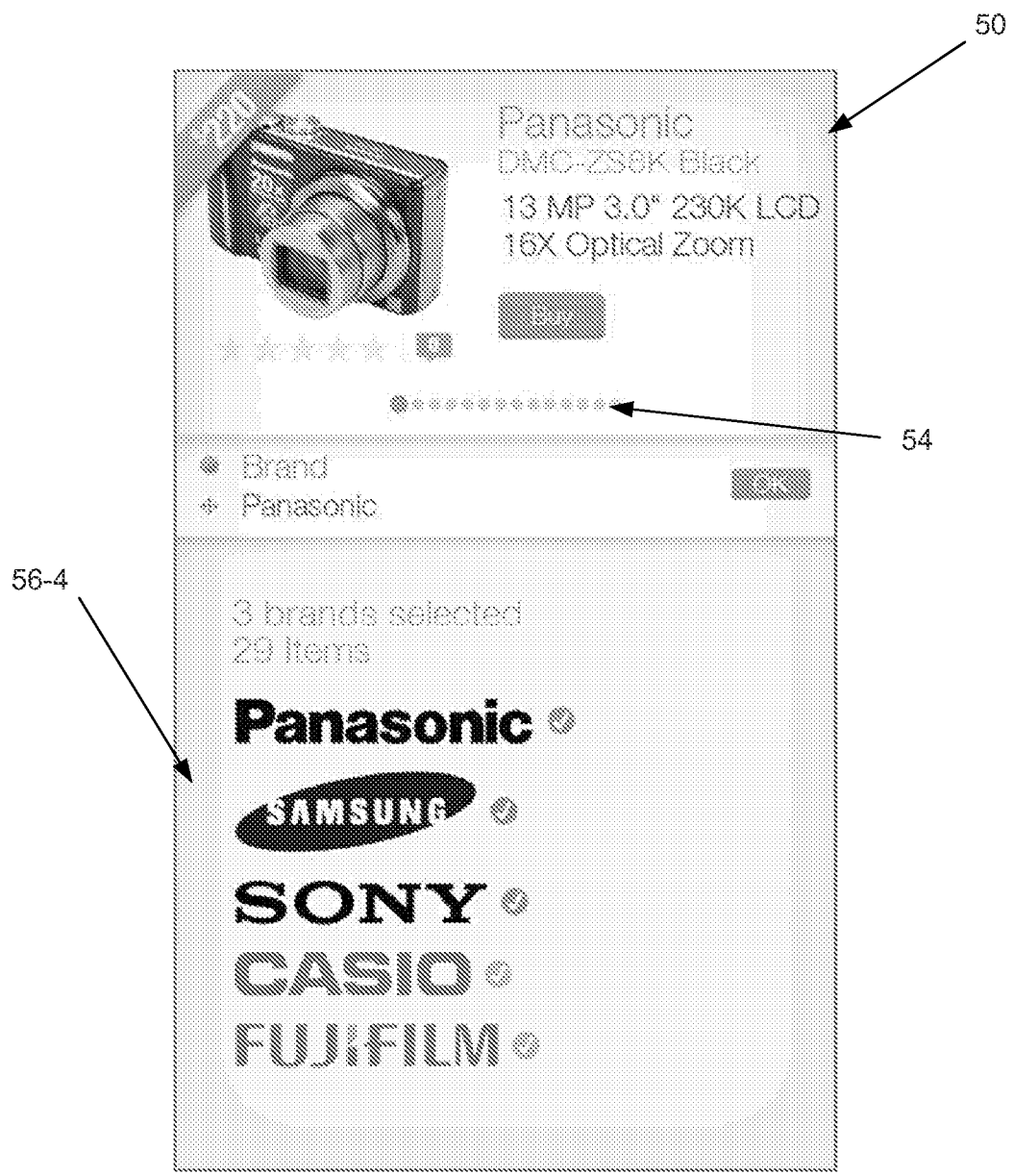
FIG. 9 illustrates a search interface which allows the user to select the product brands of the products they wish to view/compare.

The search filter may also be used with other parameters where applicable. For example, FIG. 7 illustrates a search interface which allows the user to set a search filter 56-2 to select the colors of the products they wish to view/compare. FIG. 8 illustrates a search interface which allows the user to set a search filter 56-3 to select the picture resolution range of the products they wish to view/compare. FIG. 9 illustrates a search interface which allows the user to set a search filter 56-4 to select the product brands of the products they wish to view/compare. When the user is done with setting the search filters 56, the search interface may then refine the initial search to retrieve products that fall within the specified filters. The user may select one or more search filters e.g. brand=Sony and color=red etc.

The user may select the sorting of the products in the parameters set in the search filter. For example, in cases where the search filter defines a range, the user may select to view products in a descending manner or an ascending manner. For example, if the price range is $160 to $350 the user may view the products having the higher price first or vice versa. In cases where the search filter includes a selection of one or more options, the user may assign a higher priority to an option over another option. For example, if the search filter is a selection of colors and the user chooses the black color and the blue color the user may give a higher priority to the black color over the blue. As with the priority of the product characteristics, a ranking algorithm may also be used to weigh the different sorting selections set by the user when performing the search.

In some embodiments, the search interface region 50 may wait for an indication from the user before refining the search e.g. the user may press OK, or refresh or double click or double touch in a designated area of the search interface region 50. In other embodiments, the interface may automatically refine the search when a change is detected on the interface, or when a certain time elapses after the last change.

In a preferred embodiment, the user may navigate through the products by moving the search result region 45 of the product preferably to the left to view the next product or to the right to view the previous product. However, other embodiments are also possible where the user may move the search result region 45 in one of the four directions (up, down, left, and right). In a non-limiting example of implementation, if the user is viewing the product using a touch screen display they may switch between a product and the other by touching the screen and moving it in the desired direction. Other embodiments are also possible with devices equipped with accelerometers where the user can shake the device to navigate through the different products e.g. shake once moves to the next and shake twice moves to the previous etc.

In the case where the user is navigating using the mouse and a visual pointer they may click and hold over the interface and then move it in the desired direction to view other products. In another example of implementation, a next and previous buttons may be provided to allow the user to navigate through the different products.

Figure 10A:
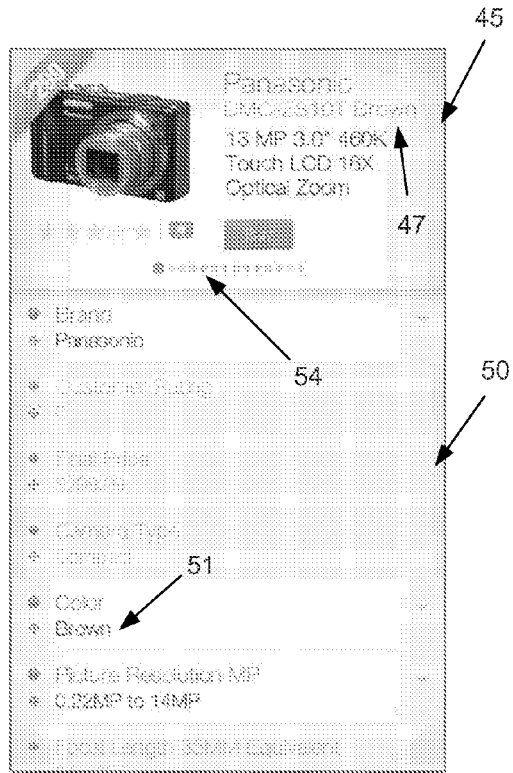
FIG. 10a illustrates the specification sheet of the first product in the search result list.
Figure 10B:
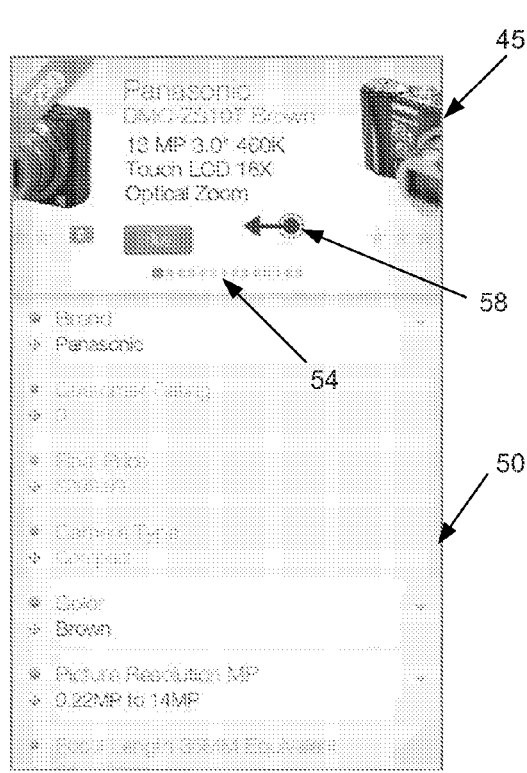
FIG. 10b illustrates the page transition between the first product and the second product in the search result list.
Figure 10C:
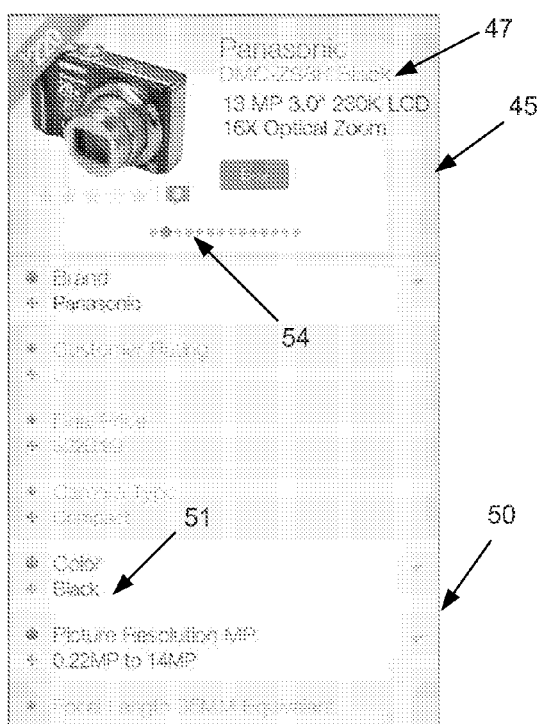
FIG. 10c illustrates the specification sheet of the second product in the search result list.

FIGS. 10*a* to 10*c* illustrate an exemplary method of navigating through the different products, in accordance with an embodiment. FIG. 10*a* illustrates the details of the first product in the list. FIG. 10*b* illustrates the transition between the first product and the second product by moving the search result region 45 to the left following arrow 58. Realize that the visual indicator 54 in FIGS. 10*a* and 10*b* indicates that the user is viewing the first product in the list. FIG. 10*c* illustrates the product details of the second product in the list. Realize that the product shown in FIG. 10*c* is a different product with different picture, price etc. This change is also reflected in the visual indicator 54 which indicates that the product shown is the second product and not the first.

In an embodiment, the interface updates the specification sheet when a different product is displayed in the search result region 45. Even though the search criteria (activated product characteristics) and search filters do not change, details which are specific to the product displayed in the search result region 45 are updated with every new product. Take for example FIGS. 10*a* and 10*c*. In these Figures, the user activated the brand, color, and picture resolution as search criteria. A filter has been set on the brand to select only Panasonic products, and on the color to choose different colors. As shown in FIG. 10*a*, the camera illustrated in the search result region 45 is brown as indicated at 47. The color 51 is also indicated as brown in the search interface region 50. Turing now to FIG. 10*c*, the camera illustrated in the search result region 45 is black as indicated at 47. The color 51 has also changed to black in the search interface region 50.

Figure 11:
FIG. 11 illustrates a plurality of products displayed on the GUI as a list.

In an embodiment, it is possible to view the search results in a list as shown in FIG. 11 by tapping or double-clicking over the search result region 45 or some other location of the GUI 40.

Figure 12:
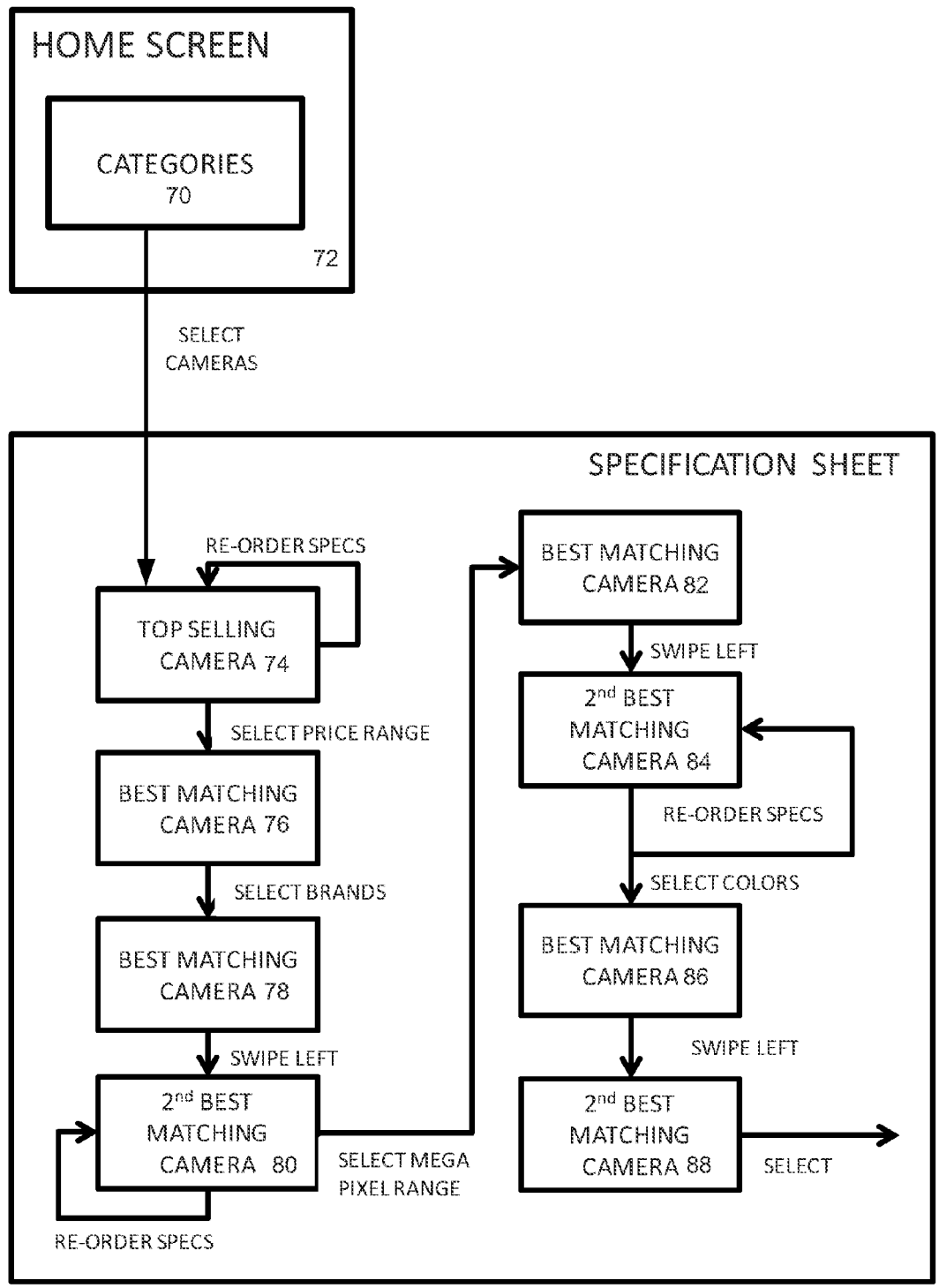
FIG. 12 illustrate an exemplary search path of the different activities that the user may perform using the specification sheet as search interface, in accordance with an embodiment.

FIG. 12 illustrate an exemplary search path of the different activities that the user may perform using the specification sheet as a search interface, in accordance with an embodiment. As shown in FIG. 12, the user may view a list of categories 70 on a home screen 72 (or type a search query to select a certain product category). In the example of FIG. 12 the user has selected camera as a category for the product. The interface may obtain a list of available cameras and illustrate the top selling camera 74 in the search result region 45 of the interface. The user may then manipulate the product characteristics of the top selling camera 74 in the search interface region 50 by activating and/or reordering one or more product characteristics and specifying a price range. The search is then refined and the best matching camera 76 is illustrated in the search result region 45. The user may also refine the search by setting a filter on the brand. The search is then refined and the best matching camera 78 is illustrated in the search result region 45. The user may view the second best matching camera 80 by moving the search result region to the left. The user may reorder the product characteristics again (specs) and set a filter on the megapixel range. The search is then refined and the best matching camera 82 is illustrated in the search result region 45. The user may view the second best matching camera 84 by swiping the search result region 45 to the left. The user may also set a filter on the color. The search is then refined and the best matching camera 86 is illustrated in the search result region 45. The user may view the second best matching camera 88 by swiping the search result region 45 to the left. If the user likes the camera 88 they may proceed to the shopping cart to buy it.

In an embodiment, if the user is interested in one or more products they may pin the products to the search results to keep them aside while they keep searching. Pinned results may appear at the beginning of the "list" of results and may be differentiated from the results of the current search context by a visual distinction. The pinning/unpinning may be effected by tapping a button in the header (e.g. near the picture). If the pinned results do not match the current search context, the product characteristics that do not match may be highlighted with a visual distinction so that the user is aware that these characteristics do not conform to the search filters.

In another embodiment, the computing machine may compare the original wishes of the consumer to the actual product they bought; and gather further statistics for product improvements. The gathered data may be more relevant than sales data because often consumers will buy a product as a compromise; whereas the consumers desires/needs can be expressed perfectly on this interface. The data may be harvested from each consumer's search interaction and may be compiled into statistics on the desires of consumers and sold back to the manufacturers.

Figure 13:
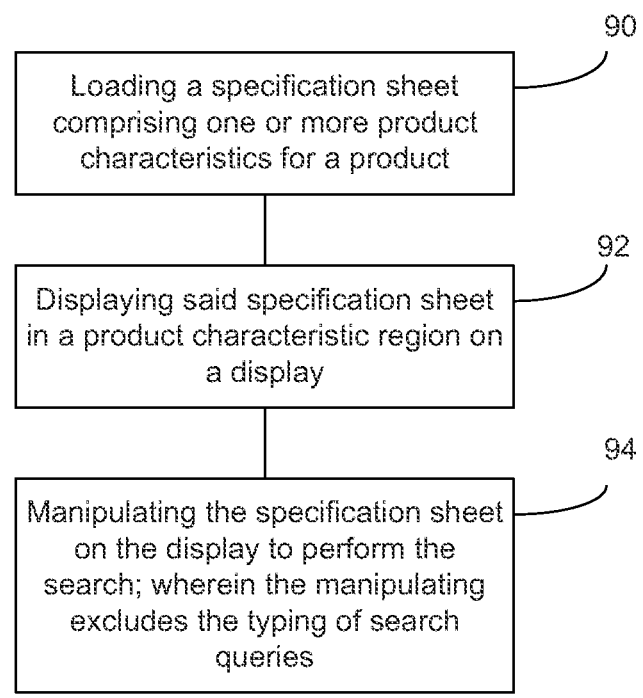
FIG. 13 is a flowchart of a method for performing a search using the specification sheet as search interface, in accordance with an embodiment.

FIG. 13 is a flowchart of a method for performing a search using the specification sheet as a search interface, in accordance with an embodiment. The method begins at step 90 by loading a specification sheet comprising one or more product characteristics for a product. Step 92 comprises displaying the specification sheet in a product characteristic region on a display. Step 94 comprises manipulating the specification sheet on the display to perform the search; wherein the manipulating excludes the typing of search queries.

Hardware and Operating Environment

Embodiments of the invention may be implemented/operated using a client machine in communication with a remote server via a communication network. In another implementation, the data may be loaded from a local database or from local data files e.g. XML, JSON etc.

The client machine can be embodied in any one of the following computing devices: a computing workstation; a desktop computer; a tablet, a laptop or notebook computer; a server; a handheld computer; a mobile telephone; a portable telecommunication device; a media playing device; a gaming system; a mobile computing device; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the client machine can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein.

Still other embodiments of the client machine include a mobile client machine that can be any one of the following: any one series of Blackberry, Playbook or other handheld device manufactured by Research In Motion Limited; the iPhone manufactured by Apple Computer; Windows Phone 7, HTC, Sony Ericsson, any telephone or computing device running the Android operating system, or any handheld or smart phone; a Pocket PC; a Pocket PC Phone; or any other handheld mobile device supporting Microsoft Windows Mobile Software, etc.

The client machine may include a display and a touch-sensitive surface. It should be understood, however, that the computing device may also include one or more other physical user interface devices, such as a physical keyboard, a mouse and/or a joystick.

Figure 14:
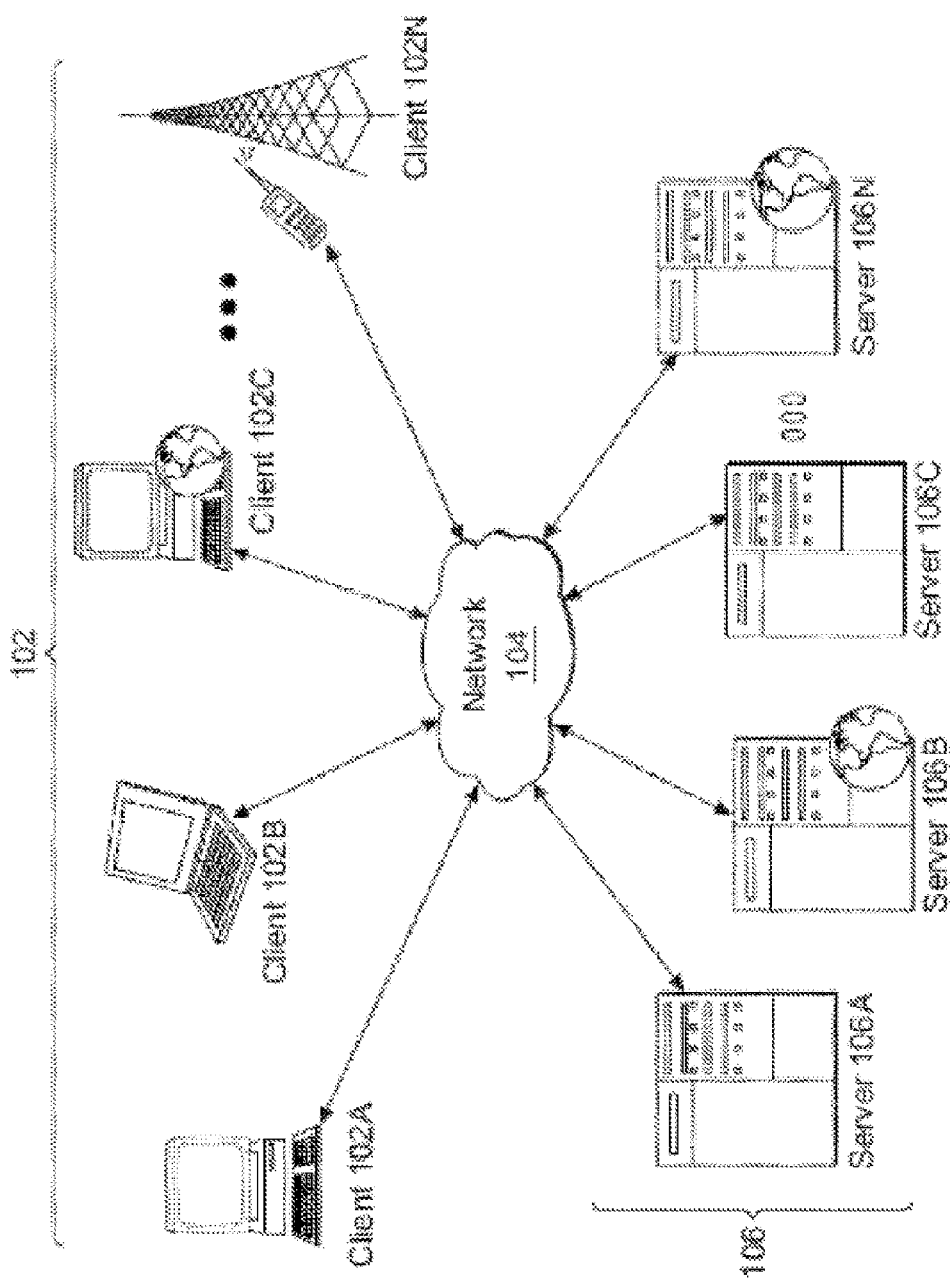
FIG. 14 illustrates an embodiment of a computing environment in which embodiments of the present invention may be practiced.

FIG. 14 illustrates an embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

The client machine 102 may in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. The client machine 102 may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above.

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server.

The network 104 between the client machine 102 and the server 106 is a connection over which data is transferred between the client machine 102 and the server 106. Although the illustration in FIG. 14 depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network comprised of multiple sub-networks located between the client machines 102 and the servers 106; a primary public network with a private sub-network; a primary private network with a public sub-network; or a primary private network with a private sub-network. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computing device comprising a memory and a processor to execute one or more programs stored on the memory for implementing a graphical user interface, the graphical user interface comprising:
a first region for displaying a single product from a search result returning one or more products;
a second region for displaying a specification sheet of the product displayed in the first region, the specification sheet including a plurality of product characteristics specific to the product, each product characteristic being provided at a given location within the second region, at least one of the product characteristics in the second region being selectively activated and selectively ranked by the user as a search criterion, wherein each location represents a ranking of the associated product characteristic with respect to other product characteristics when the product characteristic is activated as a search criterion, and wherein the ranking of a selected product characteristic is changed by dragging the selected product characteristic and dropping it in a different location in the second region;
wherein upon detection of a change in the activation and/or ranking of a selected product characteristic in the second region, a search is performed using, as search criteria, all activated product characteristics and their associated ranking, wherein the products returned by the search are displayed in the first region one product at a given time.

2. The computing device of claim 1, wherein the search results returned by the search are sorted in accordance with the ranking associated with the activated product characteristics.

3. The computing device of claim 1, wherein the graphical user interface visually reorders the product characteristics in accordance with the ranking associated with each product characteristic.

4. The computing device of claim 1, further comprising a search filter for a parameter available on one or more of the product characteristics.

5. The computing device of claim 4, wherein the search filter comprises one of:
a search range and a selection of one or more options.

6. The computing device of claim 5, the graphical user interface is adapted to receive a user input prioritizing one or more options of the search filter, and sort the products in accordance with a priority associated with each search filter option.

7. The computing device of claim 1, wherein the first region is scrollable to illustrate different products one product at a time.

8. The computing device of claim 7, wherein the product characteristics in the second region are updated every time a different product is displayed in the first region.

9. The computing device of claim 7, wherein the user may personalize a visual appearance of the specification sheet by reordering activated and non-activated product characteristics in a specified order, wherein the specified order applies to currently and subsequently viewed products.

10. The computing device of claim 7, further comprising a visual indicator that indicates a number of products found in the search, and a visual indicator that indicates a position of the product displayed in the third region with respect to the first and last products found in the search.

11. The computing device of claim 7, wherein the graphical user interface switches between one product and the other in response to swiping the second region in a desired direction.

12. The computing device of claim 7, wherein the first region comprises a photo of the product.

13. The computing device of claim 1, wherein when more than one product characteristic are activated, the graphical user interface returns sorted search results which are based on a weighted ranking of the activated product characteristics.

14. The computing device of claim 1, wherein content of the first region and of the second region is received from a remote server over a communication network and/or loaded from at least one of: a local database and data files.

15. A non-transitory computer readable storage medium storing one or more programs, the one or more programs comprising instructions which when executed by a computing device, cause the computing device to implement a graphical user interface comprising:
a first region for displaying a single product from a search result returning one or more products;
a second region for displaying a specification sheet of the product displayed in the first region, the specification sheet including a plurality of product characteristics specific to the product, each product characteristic being provided at a given location within the second region, at least one of the product characteristics in the second region being selectively activated and selectively ranked by the user as a search criterion wherein each location represents a ranking of the associated product characteristic with respect to other product characteristics when the product characteristic is activated as a search criterion, wherein the ranking of a selected product characteristic is changed by dragging the selected product characteristic and dropping it in a different location in the second region;
wherein upon detection of a change in the activation and/or ranking of a selected product characteristic in the second region, a search is performed using, as search criteria, all activated product characteristics and their associated ranking wherein the products returned by the search are displayed in the first region one product at a given time.

16. A method for performing a search using a computing device, the method comprising:
loading one or more search results representative of products, and a specification sheet for each product, the specification sheet comprising a plurality of product characteristics specific to one product;
displaying a single product in a search result region on a display;
displaying the specification sheet of the single product in a product characteristic region on the display, wherein each product characteristic is provided at a given location within the product characteristic region; and
receiving a user input on the product characteristic region, the user input including one or more of: activating, deactivating, and ranking one or more product characteristics as a search criterion; wherein each location represents a ranking of the associated product characteristic with respect to other product characteristics when the product characteristic is activated as a search criterion, wherein changing a ranking of a selected product characteristic comprises dragging the selected product characteristic and dropping it in a different location in the product characteristic region;
initiating a new search using, as search criteria, all activated product characteristics and their associated ranking in response to detection of a change in the activation and/or ranking of a selected product characteristic in the characteristic region;
Displaying products returned by the new search in the search result region a single product at a given time.

17. The method of claim 16, wherein the activating and the ranking exclude the typing of search queries.

18. The method of claim 17, wherein ranking comprises setting a new rank or modifying an existing rank.

19. The method of claim 16, wherein the search results returned by the search are sorted in accordance with the ranking associated with the activated product characteristics.

20. The method of claim 15, wherein the graphical user interface includes a search filter for a parameter available on one or more of the product characteristics, the graphical user interface being adapted to receive a user input prioritizing one or more options of the search filter, and sort the products in accordance with a priority associated with each search filter option.

21. The method of claim 16, further comprising setting a search filter for a parameter of the product characteristics prior to performing the search.

22. The method of the claim 21, wherein the search filter comprises one of: search range and a selection of one or more options.

23. The method of claim 16, wherein initiating the new search comprises refining an existing search.

24. The method of claim 22, further comprising
receiving another user input prioritizing one or more options of the search filter; and
sorting the products in accordance with a priority associated with each search filter option.

25. The method of claim 16, further comprising navigating through different products by swiping the search result region in a desired direction.

26. The method of claim 25, further comprises updating the product characteristics in the product characteristic region every time a different product is displayed in the search result region.

27. A computing device for performing product search comprising:
a processor;
a memory storing one or more programs, the one or more programs comprising instructions which, when executed by the processor of the computing device, cause the computing device to:
load one or more search results representative of products, and a specification sheet for each product, the specification sheet comprising a plurality of product characteristics for a single product;
display the single product in a search result region on a display device;
display the specification sheet of the single product in a product characteristic region on the display device, wherein each product characteristic is provided at a given location within the product characteristic region;
receive a user input on the product characteristic region including one or more of: activating, deactivating, and ranking one or more product characteristics as a search criterion wherein each location represents a ranking of the associated product characteristic with respect to other product characteristics when the product characteristic is activated as a search criterion, wherein detecting a change of ranking of a selected product characteristic comprises detecting a user input dragging the selected product characteristic and dropping it in a different location in the product characteristic region;
initiate a new search using, as search criteria, the activated product characteristics in response to detection of a change in ranking of the selected product characteristics in the characteristic region; and
display products returned by the new search in the search result region one product at a time.

28. The computing device of claim 27, wherein the display device is embedded within the computing device, the display device being a touch-sensitive display.

29. The computing device of claim 27, further comprising a communication interface, the computing device is for receiving the specification sheet from a server over a communication network using the communication interface.

30. The computing device of claim 27, wherein the computing device displays the search results on the display device in a search result region distinct from the product characteristic region, the search result region being scrollable to display different products, one product at a time.

* * * * *